(12) United States Patent
Hossain et al.

(10) Patent No.: US 9,246,370 B2
(45) Date of Patent: Jan. 26, 2016

(54) ELECTRIC MOTOR STATOR HOUSING INTERFERENCE GAP REDUCING METHOD AND APPARATUS

(71) Applicant: Remy Technologies, LLC, Pendleton, IN (US)

(72) Inventors: Noman Hossain, Fort Wayne, IN (US); Bradley D. Chamberlin, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 406 days.

(21) Appl. No.: 13/744,147

(22) Filed: Jan. 17, 2013

(65) Prior Publication Data

US 2014/0197701 A1 Jul. 17, 2014

(51) Int. Cl.
*H02K 9/22* (2006.01)
*H02K 1/18* (2006.01)
*H02K 5/20* (2006.01)
*H02K 9/19* (2006.01)

(52) U.S. Cl.
CPC *H02K 9/22* (2013.01); *H02K 1/185* (2013.01); *H02K 5/20* (2013.01); *H02K 9/19* (2013.01); *Y10T 29/49009* (2015.01)

(58) Field of Classification Search
CPC ........................................... H02K 9/22
USPC .................................................. 310/43, 64, 89
See application file for complete search history.

(56) References Cited

U.S. PATENT DOCUMENTS

| | | | | |
|---|---|---|---|---|
| 3,060,335 A | * | 10/1962 | Greenwald | 310/54 |
| 3,544,240 A | * | 12/1970 | Rundell | 417/415 |
| 5,625,245 A | * | 4/1997 | Bass | 310/306 |
| 2012/0104884 A1 | * | 5/2012 | Wagner et al. | 310/54 |

* cited by examiner

*Primary Examiner* — Dang Le
(74) *Attorney, Agent, or Firm* — Bose McKinney & Evans LLP

(57) ABSTRACT

A cooling system of an electric machine includes a stator core, a housing, and a thermal interfacial material interposed between complementary mating surfaces of the stator core and the housing for substantially eliminating air gaps therebetween. A method of cooling an electric machine having a housing and a stator includes placing a thermal interfacial material onto a heat transfer interface between the stator and the housing, whereby the thermal interfacial material reduces contact resistance at the heat transfer interface. A method of cooling a stator of an electric machine includes heating a housing having a radially inner surface, coating a radially outer surface of the stator and/or the radially inner surface of the housing with a thermal interfacial material, and inserting the stator into the heated housing, whereby the thermal interfacial material is interposed between the inner surface of the housing and the outer surface of the stator.

7 Claims, 5 Drawing Sheets

ELECTRIC MOTOR STATOR HOUSING INTERFERENCE GAP REDUCING METHOD AND APPARATUS

CROSS-REFERENCE

This application is filed on the same day as co-pending U.S. patent application Ser. No. 13/744,229, entitled "ELECTRIC MOTOR ROTOR THERMAL INTERFACE FOR HUB/SHAFT," and Ser. No. 13/744,167, entitled "ELECTRIC MOTOR ROTOR THERMAL INTERFACE WITH AXIAL HEAT SINKS." The subject matter of these two Applications is incorporated herein in entirety.

BACKGROUND

The present invention is directed to improving the performance and thermal efficiency of electric machines and, more particularly, to methods and apparatus for improving the heat transfer process.

An electric machine is generally structured for operation as a motor and/or a generator, and may have electrical windings, for example in a rotor and/or in a stator. Such windings may include conductor wire formed as solid conductor segments or bars that are shaped to be securely held within a core, bobbin, or other structure. The stator has a cylindrical core that secures the conductor segments of the stator windings in slots disposed around the circumference of the core. In many electric machines, the stator core is densely populated so that each angular position has several layers of conductor segments installed therein. In a densely packed stator operating at a high performance level, excessive heat may be generated in the stator windings. In various applications, heat must be actively removed to prevent it from reaching impermissible levels that may cause damage and/or reduction in performance or life of the motor.

Various apparatus and methods are known for removing heat. One exemplary method includes providing the electric machine with a water jacket having fluid passages through which a cooling liquid, such as water, may be circulated to remove heat. Another exemplary method may include providing an air flow, which may be assisted with a fan, through or across the electric machine to promote cooling. A further exemplary method may include spraying or otherwise directing oil or other coolant directly onto end turns of a stator.

In many applications, there is a continual need for increasing performance and efficiency of electric machines, such as a demand for providing more power in a smaller space. Although various structures and methods have been employed for cooling an electric machine, improvement remains desirable.

SUMMARY

It is therefore desirable to obviate the above-mentioned disadvantages by providing methods and apparatus for minimizing thermal resistance and increasing thermal efficiency. As used herein, a "housing" may include several separate components or it may be formed as a unitary device, and a housing may include a cooling jacket.

According to an exemplary embodiment, a cooling system of an electric machine includes a stator core, a housing, and a thermal interfacial material interposed between complementary mating surfaces of the stator core and the housing for substantially eliminating air gaps therebetween.

According to another exemplary embodiment, a method of cooling an electric machine having a housing and a stator includes placing a thermal interfacial material onto a heat transfer interface between the stator and the housing, whereby the thermal interfacial material reduces contact resistance at the heat transfer interface.

According to a further exemplary embodiment, a method of cooling a stator of an electric machine includes heating a housing having a radially inner surface, coating at least one of a radially outer surface of the stator and the radially inner surface of the housing with a thermal interfacial material, and inserting the stator into the heated housing, whereby the thermal interfacial material is interposed between the inner surface of the housing and the outer surface of the stator.

The foregoing summary does not limit the invention, which is defined by the attached claims. Similarly, neither the Title nor the Abstract is to be taken as limiting in any way the scope of the claimed invention.

BRIEF DESCRIPTION OF THE DRAWING FIGURES

The above-mentioned aspects of exemplary embodiments will become more apparent and will be better understood by reference to the following description of the embodiments taken in conjunction with the accompanying drawings, wherein.

Corresponding reference characters indicate corresponding or similar parts throughout the several views.

DETAILED DESCRIPTION

The embodiments described below are not intended to be exhaustive or to limit the invention to the precise forms disclosed. Rather, the embodiments are chosen and described so that others skilled in the art may appreciate and understand the principles and practices of these teachings.

Figure 1:
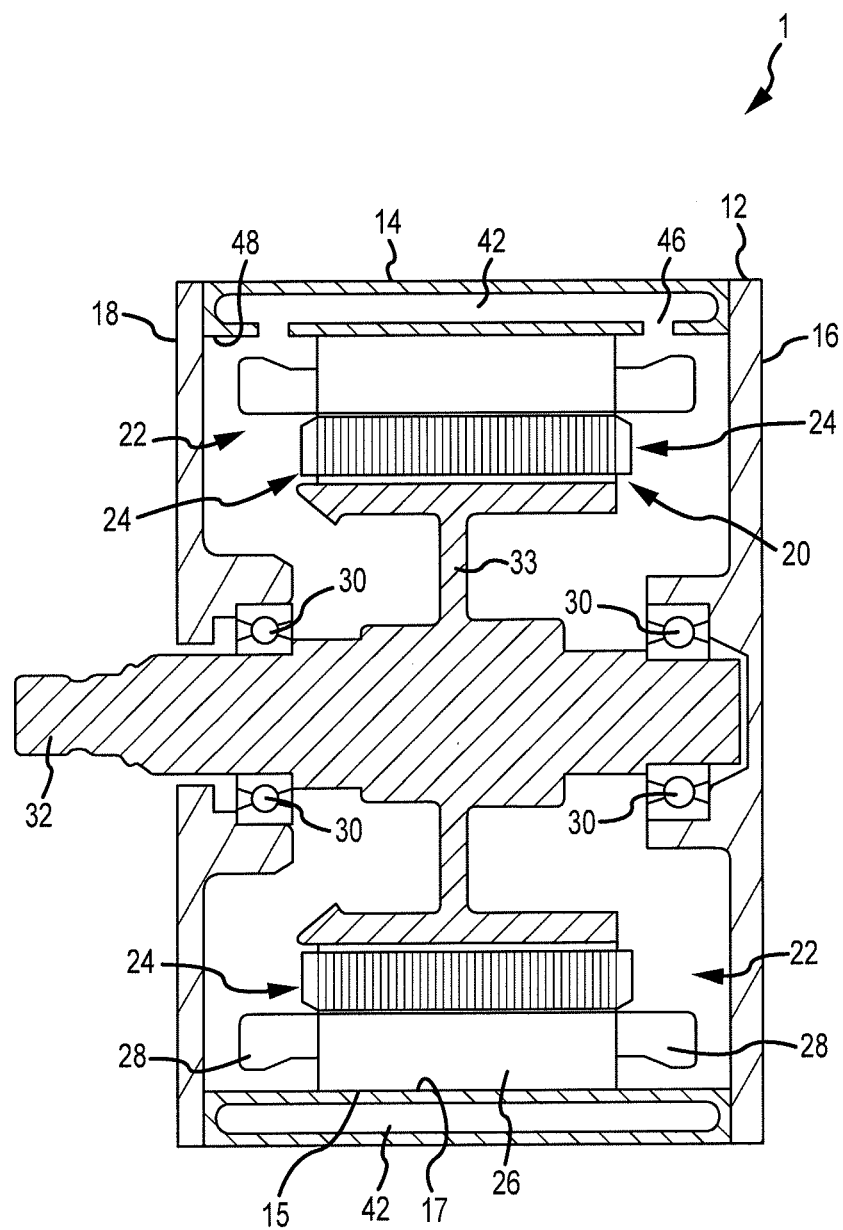
FIG. 1 is a schematic view of an electric machine.

FIG. 1 is a schematic cross sectional view of an exemplary electric machine assembly 1. Electric machine assembly 1 may include a housing 12 that has a housing body 14, a first end cap 16, and a second end cap 18. An electric machine 20 is housed within a machine cavity 22 at least partially defined by housing 12. Housing body 14 may be a portion of a unitary housing, and may be referred to herein as a "body." Electric machine 20 includes a rotor assembly 24, a stator assembly 26 including stator end turns 28, bearings 30, and an output shaft 32 secured as part of rotor 24. Rotor 24 rotates within stator 26. Rotor assembly 24 is secured to shaft 32 by a rotor hub 33. In alternative embodiments, electric machine 20 may have a "hub-less" design.

In some embodiments, module housing 12 may include at least one coolant jacket 42, for example including passages within body 14 and stator 26. In various embodiments, coolant jacket 42 substantially circumscribes portions of stator assembly 26, including stator end turns 28. A suitable coolant may include transmission fluid, ethylene glycol, an ethylene glycol/water mixture, water, oil, motor oil, a gas, a mist, any combination thereof, or another substance. A cooling system may include nozzles (not shown) or the like for directing a coolant onto end turns 28. Module housing 12 may include a plurality of coolant jacket apertures 46 so that coolant jacket 42 is in fluid communication with machine cavity 22. Coolant apertures 46 may be positioned substantially adjacent to stator end turns 28 for the directing of coolant to directly contact and thereby cool end turns 28. For example, coolant jacket apertures 46 may be positioned through portions of an inner wall 48 of body 14. After exiting coolant jacket apertures 46, the coolant flows through portions of machine cavity 22 for cooling other components. In particular, coolant may be directed or sprayed onto hub 33 for cooling of rotor assembly 24. The coolant may be pressurized when it enters the housing 12. After leaving the housing 12, the coolant may flow toward a heat transfer element (not shown) outside of the housing 12, for removing the heat energy received by the coolant. The heat transfer element can be a radiator or a similar heat exchanger device capable of removing heat energy.

Figure 2B:
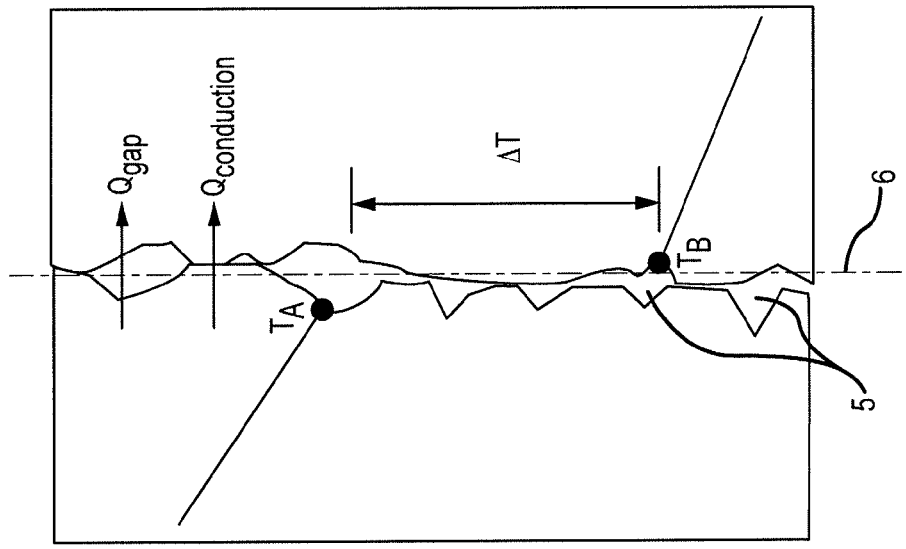
FIGS. 2A and 2B are schematic views showing heat transfer across the interface of two abutting surfaces.
Figure 2A:
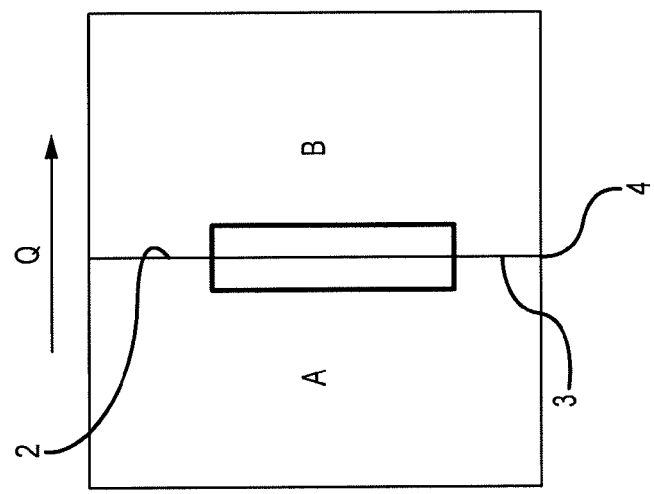

FIG. 2A is a schematic view of two contacting surfaces and FIG. 2B is a schematic view of a portion thereof. When respective complementary mating surfaces 2, 3 of two objects, A and B, are brought into abutment, a quantity of heat Q is transferred by conduction across a heat transfer interface 4. Due to machining limitations, no two solid surfaces ever form a perfect contact when they are pressed together. By comparison with an ideal mating interface, shown in FIG. 2B as a straight line 6, the actual surfaces only approximate being planar and smooth. Tiny air gaps 5 always exist between the two contacting surfaces 2, 3 due to their roughness. Such air gaps 5 create thermal resistance, also referred to as contact resistance, which can create a significant temperature difference between two mating surfaces. In the illustrated example, when heat transfer interface 4 is rough, a temperature $T_A$ of object A and a temperature $T_B$ of object B do not easily equalize because heat transfer $Q_{GAP}$ across air gaps 5 is limited compared with heat transfer $Q_{CONDUCTION}$ through contiguous surfaces. As a result of the air gaps, a temperature difference $\Delta T$ is maintained along portions of heat transfer interface 4 that are missing conduction paths. This same principle applies, for example, to the contiguous interfaces between the outer surfaces 15 of stator 26 and the radially inward surfaces 17 of inner wall 48 (FIG. 1). This contact resistance reduces the thermal efficiency of heat transfer from stator core surfaces 15 into a housing, such as housing 12 that includes a cooling jacket 42.

Figure 3:
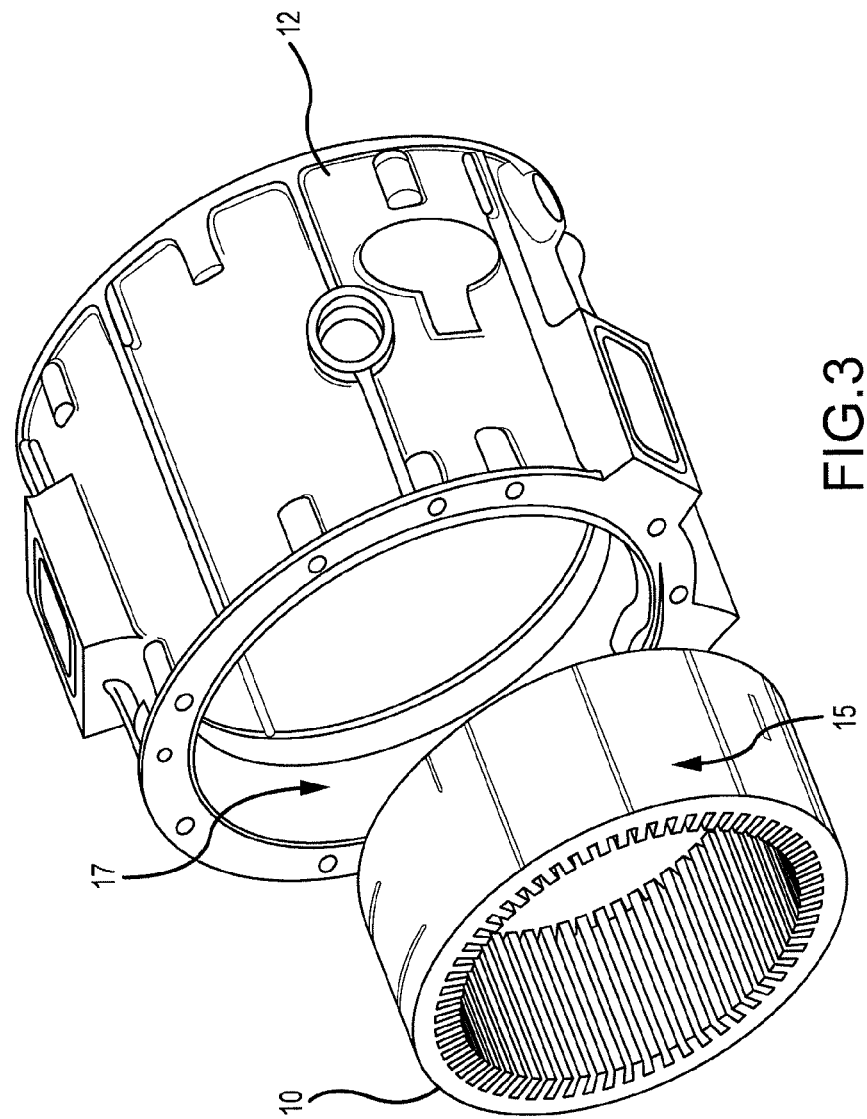
FIG. 3 is a perspective view of a stator core for insertion into a housing that may contain a cooling jacket.

FIG. 3 is a perspective view showing mating surfaces of an exemplary stator core 10 and housing 12. The outside surface 15 of stator core 10 is formed to snugly fit in abutment with the radially inner surface 17 of a cooling jacket 42 or other housing surface, such as an interior surface of a housing formed without a cooling jacket. Stator core 10 is typically formed as one or more stack(s) of individual steel laminations. Alternatively, stator core 10 may be formed as an assembly of interlocking segments. In either case, outer stator core surface 15 and inner housing surface 17 are generally circular in shape, and any variations in such circular shapes create a keyed cooperation between surfaces 15, 17, thereby maintaining a maximum surface area of contact therebetween. Surfaces 15, 17 are substantially parallel and are mated with an interference fit.

In an exemplary manufacture, housing 12 has a body 14 that includes cooling jacket 42. Housing 12 is heated to approximately 235° F. A thermal interfacial material (TIM) having a high thermal conductivity and having a coefficient of thermal expansion (CTE) approximating that of surfaces 15, 17 is applied to outer stator core surface 15. For example, the TIM may be a liquid having a paste-like consistency, a thermal conductivity of 1 to 20 W/m·K, a thickness of 0.02 to 0.5 mm, and a maximum temperature rating of 200° C. The TIM may be used without a hardener and associated curing, or a hardener may be mixed with the TIM before applying it to surface 15. The viscosity of the TIM may be adjusted to optimize flow and removal of air during assembly. The maximum temperature rating of the TIM may be increased to over 350° C., but curing of such material may be difficult and/or impractical.

Figure 4:
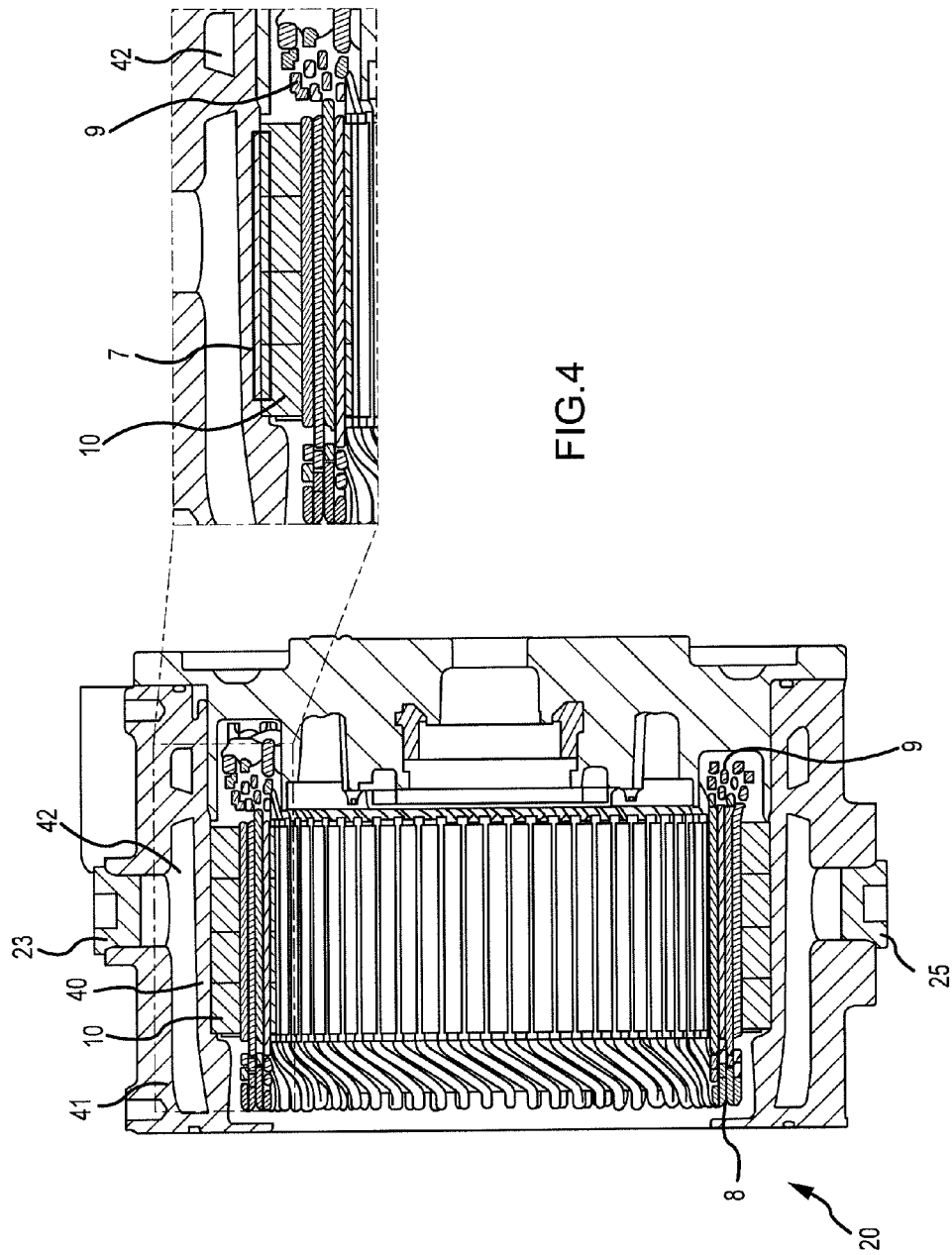
FIG. 4 is a cross-sectional view of an electric machine having thermal interface material (TIM) placed between a stator and housing thereof, according to an exemplary embodiment.

FIG. 4 is a cross-sectional view of an exemplary, fully assembled electric machine 20, with a highlighted view of a TIM application region 7. Electric machine 20 includes a stator core 10 populated with conductor segments that protrude from each axial end of core 10 as end turns 8, 9, respectively. Cooling jacket 42 is enclosed on its radially inward side by a substantially annular wall 40 and on its radially outward side by an outer wall 41. Outer wall 41 includes coolant inlet and outlet ports 23, 25, for passing coolant from/to an external heat exchanger (not shown) such as a radiator. TIM application region 7 is the substantially cylindrical space between outside surface 15 of stator core 10 and inner surface 17 of cooling jacket 42.

Figure 5:
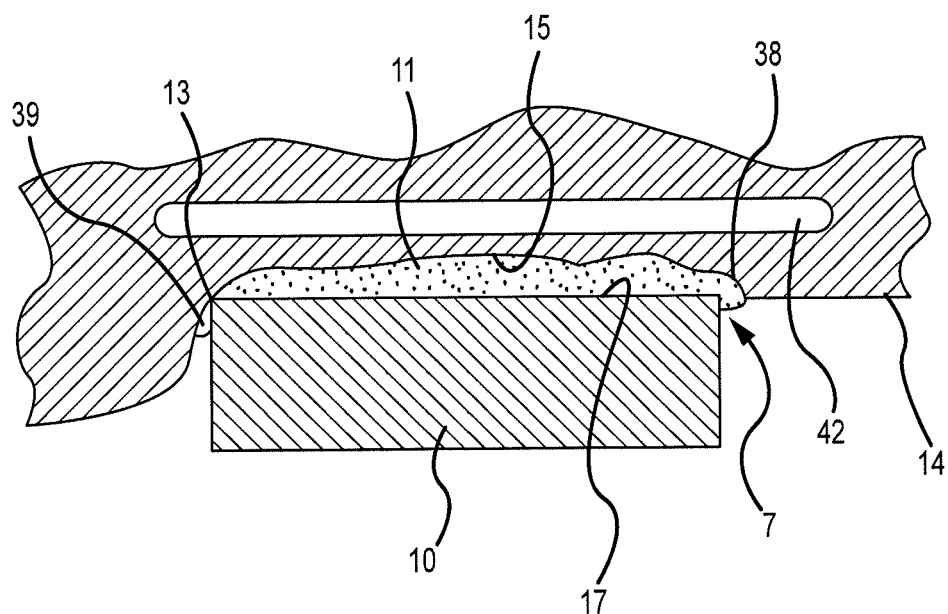
FIG. 5 is a schematic view of a TIM application region, according to an exemplary embodiment.

FIG. 5 is a schematic cross-sectional view of TIM application region 7. After assembly, one of the annular axial ends of TIM application region 7 optimally has an annular bead 38 of TIM at the interface of surfaces 15, 17. Bead 38 results from excess TIM being pushed out of the interface or scraped off one or both of surfaces 15, 17. The other axial end of TIM application region 7 may include an annular sealing member 39, such as an O-ring, a bead of epoxy, a raised portion of stator core 10 and/or a raised or interlocking portion of annular wall 40, or other structure. Sealing the TIM 11 at the axial ends of the interface may be necessary in applications where TIM 11 remains in a liquid state and is not cured. Such sealing may prevent migration of air and other contaminants into the TIM spaces, and may prevent displacement of the TIM. Structure of jacket 14 and/or housing 12 may be adapted to seal TIM application region 7. For example, a portion of jacket 14 may be formed so that an end corner 13 abuts such portion to thereby provide at least a partial seal and a closure of one axial end of region 7. Sealing TIM application region 7 may create a vacuum therein, whereby migration of TIM 11 or air is prevented. Annular sealing members 38, 39 may be required when migration of TIM 11 is foreseen, for example when viscosity of TIM 11 is low and/or when TIM at a radially outer edge may be subjected to contaminants. In some applications, such sealing may be effected by use of a temporary gasket that is only required during the manufacturing process. Seals 38, 39 may alternatively include O-rings, gaskets, resin, fiber, and/or structural barriers that block any exit paths out of TIM application region 7. When thermally conductive potting compound (not shown) or the like is used to fill spaces of electric machine 1 that include end turns 28, such potting compound may be used to seal one or more axial ends of stator core 10 and the associated axial end(s) of TIM application region 7.

TIM 11 may be partially or fully cured by being mixed with a hardener. Typically such curing takes approximately two hours at room temperature and approximately five minutes at an elevated temperature such as 100° C. Alternatively, TIM 11 may remain in a liquid state when annular sealing members 38, 39 seal TIM application region 7 with separate materials such as beads of epoxy. Further, when TIM 11 is squeezed so that one or both of annular sealing members 38, 39 includes a TIM bead, this exposed TIM may harden and effect a seal. In some applications, TIM 11 maintains a consistency of grease and does not cure. For example, air gaps 5 that exist as a part of imperfections of surfaces 15, 17 may be isolated, and TIM 11 displacing the air of such spaces is also isolated. Curing and an associated use of hardeners may thereby be unnecessary and/or undesirable. When TIM 11 has a high viscosity and no migration, the absence of thermal epoxies or other hardeners may reduce shrinkage and similar reliability issues. Depending on a particular application, TIM 11 may contain silicone, alumina or other metal oxides, binding agents, epoxy, and/or other material. TIM 11 has a high thermal conductivity and a high thermal stability, and may be formulated to have minimal evaporation, hardening, melting, separation, migration, or loss of adhesion. Suitable materials are available from TIMTRONICS. However, due to the small size and space of air gaps 5, the size and shapes of fillers and other ingredients of TIM 11, such as alumina, is typically kept below 0.03 mm.

The rate of assembly is typically as slow as is practical. Specifically, when stator core 10 is being inserted, a slow insertion movement helps distribute TIM 11 into air gaps 5. The high conformability of TIM 11 assures that nearly all air is removed. A longer cure time assures that TIM 11 spreads and becomes uniformly distributed. For example, a nominal TIM thickness may be 0.03 mm. By slowly lowering the heated housing in an axial direction onto the TIM-coated stator, the interference fitting process removes air gaps 5 by slowly squeezing TIM. Once air gaps 5 have been filled, TIM 11 does not readily migrate because air gaps 5 are not continuous. In other words, the tight fitment at interface 7 and the lack of channels for TIM migration prevent TIM 11 from being displaced prior to curing. In manufacturing, TIM 11 is metered to assure that a precise volume is being applied, whereby residue is minimized and TIM interface 7 becomes uniformly filled. In an alternative manufacture, TIM 11 may be placed onto inner surface 17 of cooling jacket 42 prior to assembly, or both surfaces 15, 17 may be coated prior to assembly. To assure that all air gaps 5 are filled, annular rubber blade(s) (not shown) or the like may be used for spreading TIM 11 onto one or both of surfaces 15, 17 in any number of passes, prior to assembly. Since it may be desirable for TIM 11 to have adherence properties that resist flow, the coating of surface(s) 15, 17 is typically performed by radially forcing TIM 11 against such surface(s).

Testing of exemplary embodiments has shown significant advantages for heat transfer. In one test, a stator assembly was modified so that individual stator phase windings were connected in series, whereby $I_A = I_B = I_C$. The stator assembly was then installed with an interference fit into a heated housing, without adding TIM at the stator/housing interface. Pure water was circulated, at over 7 liters per minute, in the cooling jacket of the housing at room temperature, and an electrical current was passed through the series stator windings for thirty minutes. Three test conditions were defined by three corresponding current levels. The temperatures of the housing and stator were measured and recorded for each of the three test conditions. The same stator was then removed and its outer surface was coated with TIM, the housing was heated for interference fitting, and then the TIM-coated stator was re-installed into the housing. The variation of test conditions and corresponding temperature measurements were then performed in an identical manner respecting the non-TIM arrangement. This three-level comparison testing was performed for a silicone TIM composition having a thermal conductivity of 3.7 W/m·K and containing binding agents. The TIM provided excellent wetting without bleeding or separation. The stator outside diameter (OD) and roundness and the housing inside diameter (ID) and roundness were inspected before each test to verify a minimal and negligible change in structural dimensions as a result of the testing. The mating surfaces were cleaned between each test run. A maximum temperature observed in the stator immediately after removing the highest level of electrical current was 99° C., for the non-TIM structure. The corresponding maximum stator temperature for the structure having TIM in the stator/housing interface was 78° C. These and other test results show a significant improvement in transferring heat from a stator to a coolant jacket of a housing by placement of TIM at the interface therebetween.

Although exemplary embodiments are described for an annular heat transfer interface between surfaces 15, 17, the outer surface 15 of stator core 10 may have any appropriate shape. For example stator core 10 may be formed of individual core segments (not shown) that are connected to one another to thereby have an outer stator core surface that may include gaps, slots, protrusions, and other deviations from a relatively smooth cylinder. In such a case, large gaps and holes may be filled with a thermally conductive potting material or the like and cured, prior to TIM coating and insertion into a housing. By this process, the irregularities in a segmented stator core are substantially eliminated prior to placing TIM into the heat transfer interface. Similarly, any continuous grooves, notches, or protrusions along either mating surface should be removed prior to assembly, so that TIM migration is substantially prevented by elimination of potential migration channels. In other words, by eliminating exit passageways, the TIM cannot migrate. When surfaces 15, 17 have an interference fit, TIM only spreads and fills air gaps 5. Accordingly, when stator core 10 is formed as a stack of individual steel laminations, the assembled lamination stack may be machined so that outer surface 15 is as smooth as is practical. In such a case, the corresponding inner surface 17 of housing 12 should have a diameter that is enlarged to account for any reduction in the diameter of surface 15 due to machining, thereby maintaining a tight interference fit.

By reducing thermal resistance between stator 26 and cooling jacket 42, conductance of the stator heat into cooling jacket 42 is greatly improved. In addition, the improved thermal interface may reduce manufacturing costs and further improve performance of electric machine 20 by eliminating a need to machine or turn a stator core. For example, when laminations of stator 26 are stamped with a tight tolerance, and the subsequent lamination stacking, bonding, and securement processes are maintained with accuracy, any surface irregularities of stator 26 are sufficiently reduced to eliminate a need for turning the stator core when such irregularities are filled with TIM. By eliminating a turning operation, electrical shorting in a stator core is greatly reduced.

While various embodiments incorporating the present invention have been described in detail, further modifications and adaptations of the invention may occur to those skilled in the art. However, it is to be expressly understood that such modifications and adaptations are within the spirit and scope of the present invention.

What is claimed is:
1. A cooling system of an electric machine, comprising
a stator core;
a housing including a cooling jacket wall;
a thermal interfacial material interposed between complementary mating surfaces of the stator core and the housing cooling jacket wall for substantially eliminating air gaps therebetween; and
seals at axial ends of the thermal interfacial material for enclosing the material between the complementary mating surfaces.

2. The cooling system of claim 1, wherein the seals include epoxy.

3. The cooling system of claim 1, wherein the enclosed thermal interfacial material comprises liquid.

4. The cooling system of claim 1, wherein the complementary mating surfaces have an interference fit.

5. The cooling system of claim 1, wherein the thermal interfacial material has a nominal thickness between 0.02 mm and 0.5 mm.

6. The cooling system of claim 1, wherein the thermal interfacial material is substantially uncurable thermal grease.

7. The cooling system of claim 1, wherein the respective mating surfaces of the stator core and the housing are substantially annular.

* * * * *